United States Patent
Nestares et al.

(10) Patent No.: US 9,712,720 B2
(45) Date of Patent: Jul. 18, 2017

(54) IMAGE REFOCUSING FOR CAMERA ARRAYS

(71) Applicant: Intel Corporation, Santa Clara, CA (US)

(72) Inventors: Oscar Nestares, San Jose, CA (US); Yong Jiang, Shanghai (CN)

(73) Assignee: Intel Corporation, Santa Clara, CA (US)

(*) Notice: Subject to any disclaimer, the term of this patent is extended or adjusted under 35 U.S.C. 154(b) by 480 days.

(21) Appl. No.: 14/293,611

(22) Filed: Jun. 2, 2014

(65) Prior Publication Data

US 2015/0348239 A1    Dec. 3, 2015

(51) Int. Cl.
| | |
|---|---|
| G06K 9/00 | (2006.01) |
| H04N 1/60 | (2006.01) |
| G06T 5/00 | (2006.01) |
| G06T 5/50 | (2006.01) |
| H04N 5/232 | (2006.01) |
| H04N 5/247 | (2006.01) |
| H04N 1/409 | (2006.01) |

(52) U.S. Cl.
CPC .......... *H04N 1/6027* (2013.01); *G06T 5/003* (2013.01); *G06T 5/50* (2013.01); *H04N 1/409* (2013.01); *H04N 5/23229* (2013.01); *H04N 5/247* (2013.01); *G06T 2207/10052* (2013.01); *G06T 2207/20016* (2013.01); *G06T 2207/20224* (2013.01)

(58) Field of Classification Search
CPC combination set(s) only.
See application file for complete search history.

(56) References Cited

U.S. PATENT DOCUMENTS

| | | | |
|---|---|---|---|
| 2012/0070097 A1* | 3/2012 | Adams, Jr. | H04N 5/23212 382/255 |
| 2012/0076403 A1* | 3/2012 | Nestares | G06T 5/50 382/167 |

(Continued)

FOREIGN PATENT DOCUMENTS

| | | |
|---|---|---|
| JP | 2013012820 | 1/2013 |
| KR | 1020110054196 | 5/2011 |
| WO | 2014014135 | 1/2014 |

OTHER PUBLICATIONS

Vaish et al., "Synthetic Aperture Focusing using a Shear-Warp Factorization of the Viewing Transform", 2005, 8 pages.

(Continued)

*Primary Examiner* — Alex Liew
(74) *Attorney, Agent, or Firm* — Green, Howard, & Mughal LLP

(57) ABSTRACT

Techniques related to image refocusing for camera arrays using a space variant filter based on a pixel by pixel blur level associated with a difference between a reference image and a basic refocused image are discussed. Such techniques may include taking the difference between the reference image and the basic refocused image and applying a space variant filter to the basic refocused image to generate a final refocused image having a region of increased blur with respect to the all in focus reference image. The blur level implemented by the space variant filter may be based on the difference and, optionally, the reference image noise level and the reference image gradient.

24 Claims, 11 Drawing Sheets

(56) References Cited

U.S. PATENT DOCUMENTS

2012/0082372 A1* 4/2012 Mittal ................ G06K 9/38
  382/159
2012/0188386 A1* 7/2012 Kulkarni ............ H04N 5/23212
  348/208.11
2012/0300115 A1 11/2012 Seiji

OTHER PUBLICATIONS

Venkataraman et al., "PiCam: An Ultra-Thin High Performance Monolithic Camera Array", ACM Transactions on Graphics, vol. 32, No. 6, Article 166, Nov. 2013, 13 pages.
International Preliminary Report on Patentability, mailed Dec. 15, 2016, for PCT Patent Application No. PCT/US15/26492.
International Search Report & Written Opinion, mailed Jul. 21, 2015, for PCT Patent Application No. PCT/US15/26492.
Pham, T. "An Image Restoration by Fusion", Pattern Recognition, vol. 34, Issue 12, Dec. 2001, p. 2403-2411 (http://www.sciencedirect.com/science/article/pii/s0031320300001643#).

* cited by examiner

IMAGE REFOCUSING FOR CAMERA ARRAYS

BACKGROUND

Image refocusing may be used to refocus images after they are taken. For example, such refocusing techniques may be used to simulate a shallow depth of field after the fact (e.g., after the image or images are taken). A shallow depth of field in imaging may provide an aesthetic with a portion, region, or object-of-interest in an image being in focus and another portion or portions of the image being out of focus and having a blur. Such an aesthetic may be desirable to users. In typical photography, such shallow depth of field and related aesthetics may be attained using larger apertures and other photographic techniques while the image is being taken.

In image refocusing, there are several techniques to simulate a shallow depth of field. For example, plenoptic cameras may sample the light-field at the entrance pupil of the camera in 4D using a microlens array placed in front of the sensor that separates rays entering at different angles before they are averaged by the sensor. Such techniques allow refocusing after the fact by rendering views in which the integration to convert the 4D light-field to an image occurs at specific angles. The main disadvantage of such techniques is that the maximum aperture is limited by the physical aperture of the main lens and that it requires a complicated optical setup with a zoom lens in front of the camera. Furthermore, such zoom lenses are difficult to integrate in mobile platforms.

In another example, a camera array may be used to achieve refocusing after the fact. In camera array approaches, multiple images may be taken (e.g., via the camera array) and a shift and average technique may be used to achieve refocusing. For example, refocusing to a chosen depth includes selecting the displacement that corresponds to the depth, shifting the images (e.g., the multiple images obtained via the camera array), and taking the average of the images. Such techniques keep points that are at the chosen depth aligned and therefore in focus while points that are at other depths will not align and will appear blurred. Such techniques may thereby simulate a shallow depth of field as discussed. However, the results of such techniques may provide images that appear unnatural in the blurred (e.g., out of focus) regions.

As such, existing techniques do not provide refocusing after the fact with ease of use and high quality. Such problems may become critical as the desire to obtain high quality, aesthetically pleasing images in a variety of device implementations becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
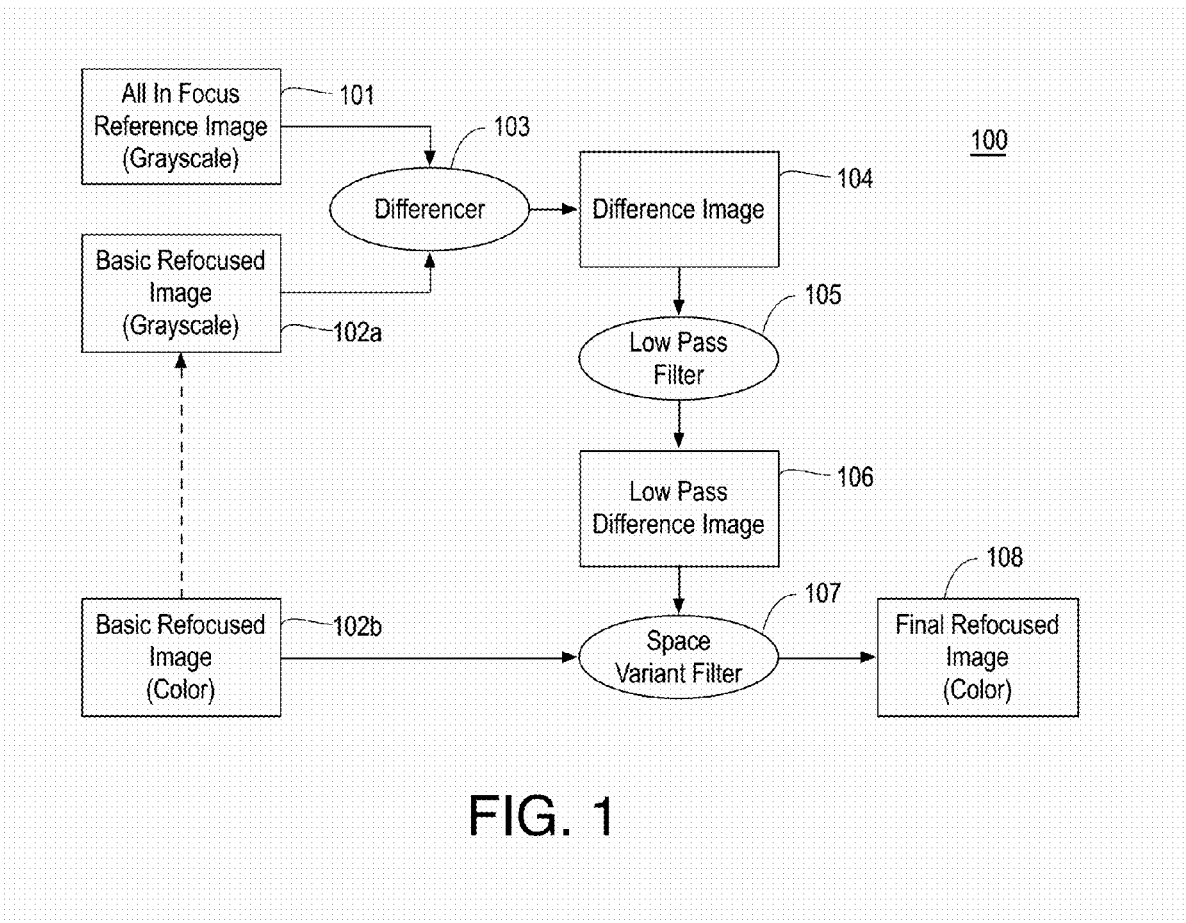
FIG. 1 is an illustrative diagram of an example system for providing image refocusing.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to image refocusing and, in particular, image refocusing based on images received via a camera array.

As described above, it may be advantageous to provide image refocusing to simulate a shallow depth of field based on images attained via a camera array. For example, a shallow depth of field and related aesthetics may be desirable to users. Also as discussed, existing techniques may provide an unnatural appearance in the blurred (e.g., out of focus) regions of the refocused image. For example, in results from shift and average techniques, the blurred regions may appear as thought they have multiple overlaying copies of the object, which may cause a choppy and unnatural appearance instead of a smoother blurring effect.

In other cases it might be possible to explicitly estimate the disparity (or depth) of each pixel in the image using two or more images coming from the camera array and to use this estimated disparity to generate a refocused image by applying different amount of blur to pixels with different depths. However this approach is computationally more expensive than the previously described shift and average technique as the dense estimation of disparity is an expensive and, in some cases, unreliable operation.

In some embodiments discussed herein, image refocusing may include obtaining images of a scene from a camera array. Based on the images, an all in focus reference image (e.g., a selected image of the obtained images) and a basic refocused image may be determined for example, the basic refocused image may be generated based on a shift and average technique including shifting the images based on a displacement associated with a desired depth and averaging the shifted images to generate the basic refocused image. The all in focus reference image and the basic refocused image may be differenced to generate a difference image. A low pass filter may be applied to the difference image to generate a low pass filter difference image. A space variant filter based on the difference image (e.g., generated using the difference image, the low pass difference image, and/or additional information) may be applied to the refocused image to generate a final refocused image. The final refocused image may include a region of increased blur with respect to the all in focus reference image. For example, a region of greater difference in the difference image or the like may be blurred by a greater amount than another region having a lesser difference. In some examples, applying the space variant filter includes applying an approximation space variant filter based on a Laplacian pyramid approximation.

Using such techniques, the generated blur has a smooth and natural appearance. Furthermore, the techniques are computationally efficient and may provide real-time processing such that users may attain results quickly and/or select and modify images in real-time. In some implementations, the techniques may be applied to video in real-time.

FIG. 1 is an illustrative diagram of an example system 100 for providing image refocusing, arranged in accordance with at least some implementations of the present disclosure. As shown in FIG. 1, system 100 may include a differencer module 103, a low pass filter module 105, and a space variant filter module 107. In various examples, differencer module 103, low pass filter module 105, and space variant filter module 107 may be implemented via one or more central processing unit(s) and/or a one or more graphics processing unit(s), as is discussed further herein. As shown in FIG. 1, differencer module 103 may receive an all in focus reference image (grayscale) 101 and a basic refocused image (grayscale) 102a. All in focus reference image (grayscale) 101 and basic refocused image (grayscale) 102a may be determined based on multiple images received via a camera array, for example.

Figure 2:
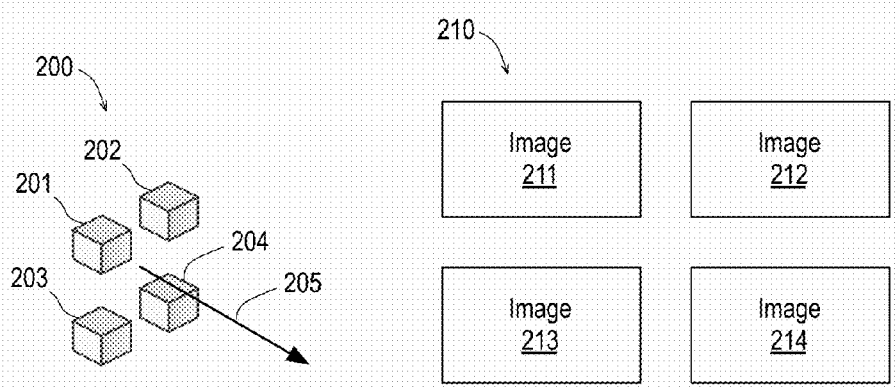
FIG. 2 illustrates an example camera array and example attained images.

FIG. 2 illustrates an example camera array 200 and example attained images 210, arranged in accordance with at least some implementations of the present disclosure. As shown in FIG. 2, camera array 200 may include multiple cameras 201-204 for attaining multiple images 211-214 in a direction 205 from cameras 201-204. As shown, an image may be attained from each camera of camera array 200 such that image 211 is attained via camera 201, image 212 is attained via camera 202, image 213 is attained via camera 203, and image 214 is attained via camera 204. In the illustrated example, camera array 200 includes four cameras 201-204 that may attain four images 211-214; however, any suitable number of cameras and associated images may be used. In various examples, camera array includes 9 cameras (e.g., in a 3×3 grid) 16 cameras (e.g., in a 4×4 grid), or the like. Furthermore, in the illustrated example, camera array 200 includes cameras 201-204 evenly spaced and arranged in a grid pattern around a center; however, camera array 200 may include any suitable arrangement and spacing. For example, cameras 201-204 may not be evenly spaced, cameras 201-204 may be arranged in another pattern (e.g., circularly, in a rectangle, only along a horizontal line, only along a vertical line, or the like). In some examples, cameras 201-204 being spaced farther apart may provide for easier separation of objects in implementing the discussed refocusing techniques. For example, the placement of cameras 201-204 may provide a synthetic aperture analogous to the aperture in a single camera implementation such that the greater the distance between cameras 201-204 the greater the synthetic aperture (and the greater the ability to provide shallow depth of focus and object separation in the discussed refocusing techniques).

Cameras 201-204 may have any suitable features for attaining images 211-214. In an embodiment, cameras 201-204 are fixed focus cameras that are approximately all in focus (e.g., in focus from a short distance of about 60 cm to 1 m to an effectively infinite distance). Furthermore, camera array 200 may be communicatively coupled to system 100 (e.g., via a wired or wireless communications connection or the like) or camera array 200 may be integral with system 100. As discussed, system 100 may attain images 211-214 from camera array 200.

Returning to FIG. 1, system 100 may receive images 211-214. One or more of images 211-214 may be used to select a reference image and/or a location of interest within the reference image. For example, one or more of images 211-214 may be presented to a user and the user may select or, based on manipulation of a presented image, passively select, a reference image of images 211-214. Furthermore, a user may select an object (e.g., a face or other object of interest) or location of interest within the reference image. For example, the selected object or location may be user selected via a touch screen displaying the images. In other examples, system 100 may select the reference image and/or the object or location of interest within the reference image. For example, system 100 may select a reference image from images 211-214 based on a location of a preselected reference camera of cameras 201-204, a quality of a reference camera of cameras 201-204, or the like. In some examples, system 100 may select an object or location within the reference image using object recognition or facial recognition techniques or the like.

As discussed, a reference image (and associated reference camera that took the reference image) and one or more objects or locations within the reference image may be determined Based on the selected reference image, all in focus reference image (grayscale) 101 may be determined by converting the selected reference image to grayscale based on any suitable conversion techniques. The reference image may be considered all in focus based on the reference camera being approximately all in focus and to differentiate it from images having blurred regions or the like generated as discussed herein. In some examples, the reference image may include out of focus or blurred areas based on the reference camera obtaining the image.

Figure 3:
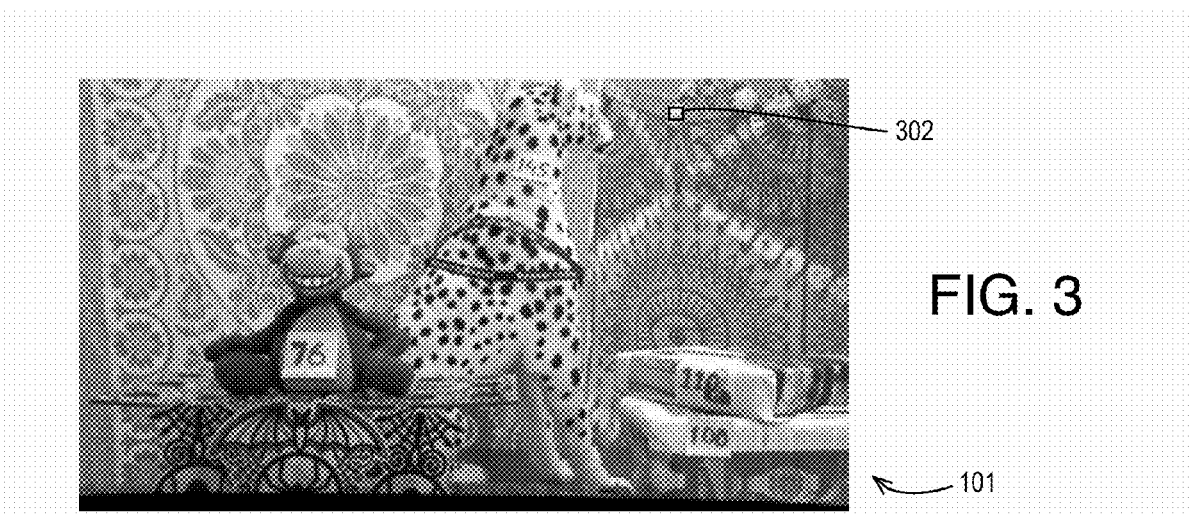
FIG. 3 illustrates an example all in focus reference image.

FIG. 3 illustrates example all in focus reference image (grayscale) 101, arranged in accordance with at least some implementations of the present disclosure. As shown in FIG. 3, all in focus reference image (grayscale) 101 may be substantially all in focus (e.g., no portions of all in focus reference image (grayscale) 101 may be substantially blurred or out of focus). Furthermore, an object or location of interest 302 may be determined within all in focus reference image (grayscale) 101. As discussed, object or location of interest 302 may be user or system determined or the like. In the illustrated example, object or location of interest 302 is a tapestry or portion of tapestry substantially in a background of all in focus reference image (grayscale) 101. In other examples, a foreground object (e.g., the stuffed monkey or the table of all in focus reference image (grayscale) 101) or a midground object (e.g., the stuffed cheetah of all in focus reference image (grayscale) 101) may be the object or location of interest.

Returning to FIG. 1, based on the selected object or location within the reference image, refocusing may be performed on images 211-214 to generate basic refocused image (color) 102b and/or basic refocused image (grayscale) 102a. For example, basic refocusing may be performed using a shift and average technique. For the sake discussion, it is assumed image 211 is the reference image and camera 201 is the reference camera; however, any of images 211-214 may be the reference image and any of cameras 201-204 may be the reference camera. In some examples, a depth may be determined associated with the selected object or location within reference image 211. Based on the depth, a displacement may be determined for all or each of images 212, 213, 214. For example, the displacement(s) may correspond to the determined depth such that the displacement(s) align (between images 211-214) the object or location of interest. Images 212, 213, 214 may then be shifted according to the determined displacement(s) and scaled based on the relative distances between cameras 202, 203, 204 and the reference camera, respectively. After the shift, the average between images 211-214 may be taken to determine basic refocused image (color) 102b and/or basic refocused image (grayscale) 102a. The shift (with scaling) and averaging technique may provide blur via keeping points in the selected depth (e.g., at the depth of the object or location of interest) aligned and therefore in focus while misaligning points that are at different depths such that they appear blurred or out of focus after determining the average.

In embodiments where a color image is generated using such techniques (e.g., basic refocused image (color) 102b), a grayscale image (e.g., basic refocused image (grayscale) 102a) may be generated based on a conversion of the color image to grayscale using any suitable techniques. In other embodiments, a grayscale image (e.g., basic refocused image (grayscale) 102a) may be generated using such techniques.

Figure 4:
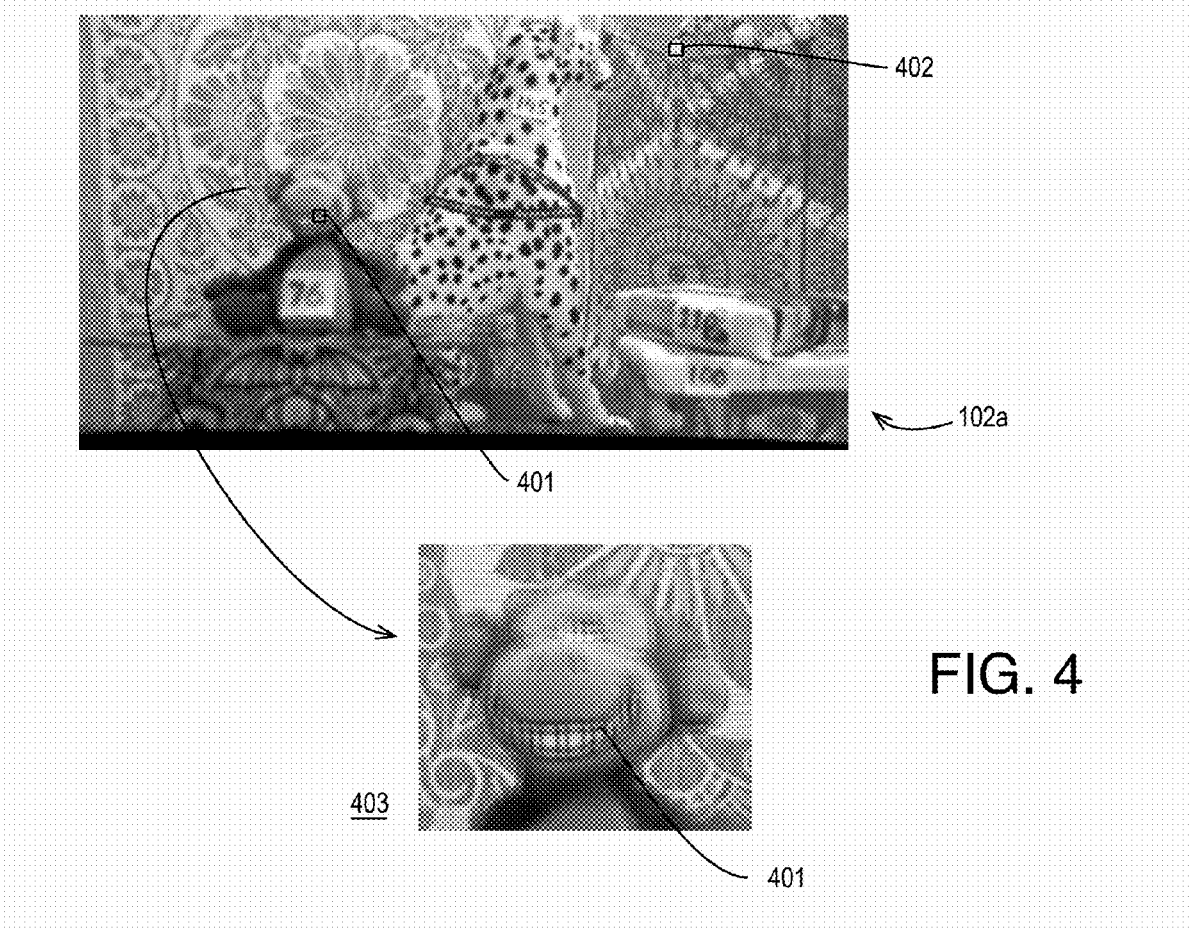
FIG. 4 illustrates an example basic refocused image.

FIG. 4 illustrates example basic refocused image (grayscale) 102a, arranged in accordance with at least some implementations of the present disclosure. As shown in FIG. 4, a blur region 401 may have been provided in basic refocused image (grayscale) 102a (in basic refocused image (grayscale) 102a other areas also have a blur effect). Blur region 401 may be provided as discussed based on a shift and average techniques. As shown in a close up view 403 of FIG. 4, blur region 401 may have an unnatural and undesirable appearance as though multiple copies of the image have been overlaid that presents a choppy effect to the viewer of basic refocused image (grayscale) 102a. Furthermore, an object or location of interest 402 is illustrated in basic refocused image (grayscale) 102a. As shown, object or location of interest 402 may remain in focus (e.g., without blur) after the discussed shift and average techniques are applied.

Returning to FIG. 1, differencer module 103 of system 100 may take a difference of all in focus reference image (grayscale) 101 and basic refocused image (grayscale) 102a to generate difference image 104 as shown in FIG. 1. Differencer module 103 may apply any suitable difference to all in focus reference image (grayscale) 101 and basic refocused image (grayscale) 102a such as an absolute value difference of the images or the like.

Figure 5:
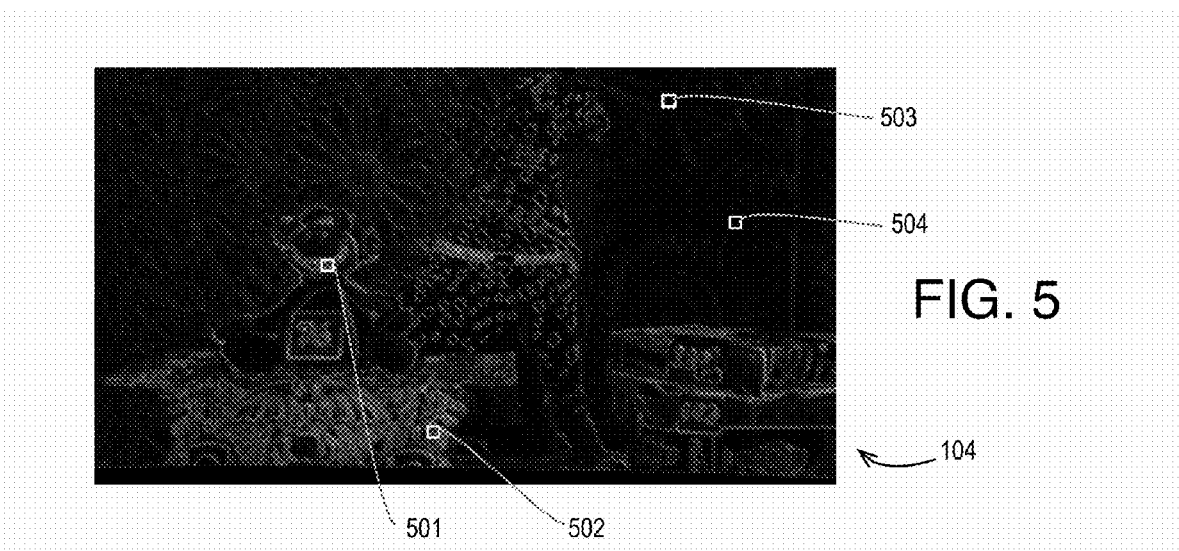
FIG. 5 illustrates an example difference image.

FIG. 5 illustrates example difference image 104, arranged in accordance with at least some implementations of the present disclosure. As shown in FIG. 5, difference image 104 may indicate or highlight locations 501, 502 where a blur effect is desirable by appearing brighter in those locations (e.g., at depths in all in focus reference image (grayscale) 101 where an out of focus effect is desirable, please refer to FIG. 3) and may not indicate or highlight locations 503, 504 where no blur effect is desirable and remained focus is instead desirable by appearing darker in those locations (e.g., at object or location of interest 302 and locations at the same or similar depth, please refer to FIG. 3). This is the case because basic refocused image (grayscale) 102a is very similar to all in focus reference image (grayscale) 101 in the regions that are in focus (e.g., at locations 503, 504) resulting in small differences, while there are more differences in the regions that are out of focus (e.g., at locations 501, 502) resulting in larger differences. As is discussed further herein, a space variant filter based on difference image 104 may be applied to basic refocused image (color) 102b to generate a final refocused image (color) 108 (please refer to FIG. 1) having a region of increased blur with respect to all in focus reference image (grayscale) 101. Such a space variant filter may improve the quality of the refocused image by applying an additional space variant blur that preserves focus in some regions (e.g., regions at locations 503, 504 or locations having a similar depth that appear darker in the difference image 104) and provides more blur in other regions (e.g., regions locations 501, 502 or locations having a depth difference with respect to locations 503, 504 that appear brighter in the difference image 104).

Returning to FIG. 1, a low pass filter may be applied to difference image 104 via low pass filter module 105 to generate a low pass difference image 106. The applied low pass filter may approximate or provide a blur width for example. The applied low pass filter may include any suitable low pass filter that passes low-frequency information within difference image 104 and reduces higher-frequency information within difference image 104. For example, low pass difference image 106 may have a substantially smooth variant blur as provided via the low pass filter.

Figure 6:
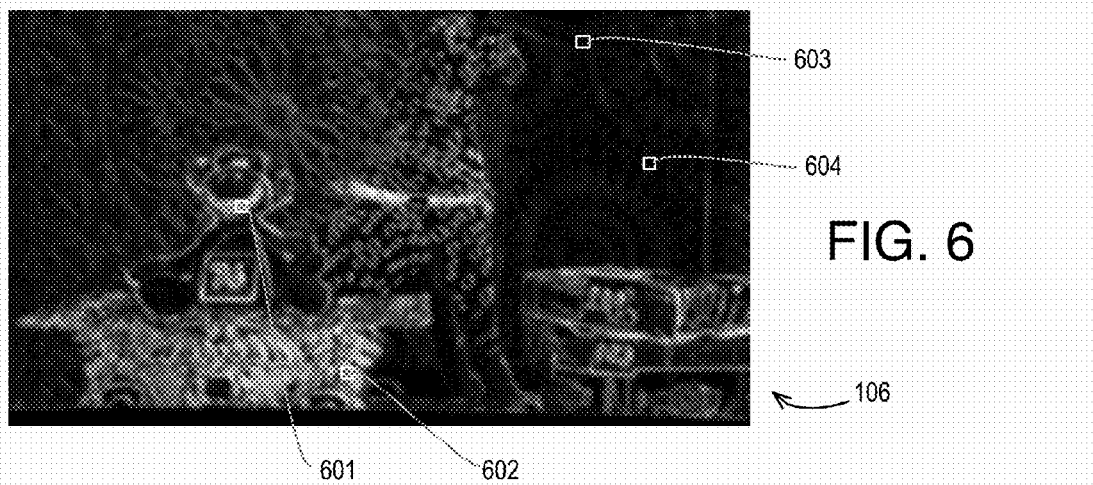
FIG. 6 illustrates an example low pass difference image.

FIG. 6 illustrates example low pass difference image 106, arranged in accordance with at least some implementations of the present disclosure. As shown in FIG. 6, low pass difference image 106 may indicate or highlight locations 601, 602 where a blur effect is desirable and may not indicate or highlight locations 603, 604 where no blur effect is desirable and remained focus is instead desirable, as discussed with reference to locations 501-504 of FIG. 5. As also shown in FIG. 6, low pass difference image 106 may indicate or provide a substantially smooth variant blur as compared to the more abrupt indication provided by difference image 104 (please refer to FIG. 5).

Returning to FIG. 1, space variant filter module 107 may apply a space variant filter based on low pass difference image 106 (and thereby difference image 104) to basic refocused image (color) 102b to generate final refocused image (color) 108. In an embodiment, the space variant filter may apply a function that estimates a blur width and takes into account other information (e.g., an estimated noise level of basic refocused image (grayscale) 102a and/or the image gradient of basic refocused image (grayscale) 102a) as is discussed further below.

In an embodiment, the space variant filter may apply a blur based on low pass difference image 106 via pixel averaging. For example, a window of pixels around a target pixel (e.g., a pixel being averaged) may be averaged to generate a new value for the target pixel. Depending on the size of the window, different amounts of blur may be applied. For example, the size of the window for each pixel may be determined based on a dense disparity map for difference image 104 or low pass difference image 106. A window of one pixel would apply no blurring (e.g., no change of the pixel value would occur), a small window would apply some blurring, and a larger window (e.g., via averaging over a large number of pixels) would provide more blurring. By applying such a space variant filter to basic refocused image (color) 102b, some portions may incur no blurring while other portions or regions may incur different levels of blur to generate final refocused image (color) 108. The discussed pixel windows may be substantially any shape such as square, rectangular, or circular, with a circularly symmetric shape being particularly advantageous in some implementations. Furthermore, the pixel windows may have any suitable size for providing either no blur (e.g., 1 pixel) through a large amount of blur such as tens of pixels or hundreds of pixels or the like. For example, the size of the pixel window may be described as a blur width, $\sigma$, such that the greater the blur width, the greater the amount of blur applied. As discussed herein, the amount of blur necessary at each pixel can be derived from the difference image 104 or a processed version of it (e.g., low pass difference image 106) by mapping dark pixels to low or no blur and brighter pixels to more blur.

In other embodiments, the space variant filter may apply a space variant blur based on an approximation. For example, the space variant filter may be applied via a Laplacian pyramid approximation technique as is further discussed herein. For example, a basic refocused image Laplacian pyramid based on basic refocused image (color) 102b and a weighting Gaussian pyramid based on low pass difference image 106 may be generated. A product of the basic refocused image Laplacian pyramid and the weighting Gaussian pyramid may be determined and the product (pyramid) may be reconstructed to generate final refocused image (color) 108. In some examples, the discussed Laplacian pyramid approximation technique may be applied independently to each color channel of basic refocused image (color) 102b to generate final refocused image (color) 108. Such approximation techniques may save a substantial amount of computing resources. This approximation together with the approximate blur map based in the difference image can enable real time applications like refocusing while previewing the input video stream (e.g., viewfinding). Furthermore, such approximation techniques may provide high quality results in final refocused image (color) 108 very close to a direct implementation applying the spatially variant width blur kernel to each pixel in the basic refocused image.

Previously it was mentioned that to estimate the blur level other information might be used in addition to the difference image. In particular the noise level and the gradient of all in focus reference image (grayscale) 102a may be used. The purpose of the noise level estimation is to avoid introducing any extra blur in the regions that are selected to be in focus in the basic refocused image. One side effect of taking the average of the shifted images is that regions that are in focus (for which the displacement is properly aligning the objects in different images) will be averaging values from several noisy inputs (in general input images will be affected by noise) resulting in values that are less affected by noise. Therefore, even if both all in focus reference image (grayscale) 101 and basic refocused image (grayscale) 102a are very similar in the regions that are in focus, they will differ in the amount of noise affecting them in those regions by the previously detailed side effect of averaging. This will generate differences that might be noticeable in the difference image 104 and that are not caused by a difference in blur but by a difference in noise. To avoid introducing blur in these regions we estimate the noise level in all in focus reference image (grayscale) 101. This noise level can be used in a way such that differences smaller than the noise level are assigned a blur width of 1 pixel (no blur). For example, one way to achieve this is to subtract the noise level from the absolute difference and then set all negative values to 0 which will be mapped to a blur width of 1 pixel (no blur).

The purpose of using the gradient of all in focus reference image (grayscale) 101 is to avoid excessive blurring in regions that might be slightly misaligned before taking the average but that have strong intensity discontinuities. These regions with slight misalignment will require some amount of extra blur. In the case they contain strong edge discontinuities, even a small misalignment can produce a strong difference image that will correspond to a large blur that is best avoided (e.g., otherwise undesirable blur will occur). The gradient of the all in focus reference image (e.g., which can be estimated as the square root of the gradient in x squared plus the gradient in y squared) provides information about regions with such strong intensity discontinuities that may be used to correct the amount of blur given by the difference image. One way to achieve this is by normalizing the difference image by a modified version of the gradient image where we have previously added the average of the gradient image to avoid numerical instabilities during the normalization, e.g., d/(g+meang).

Figure 7:
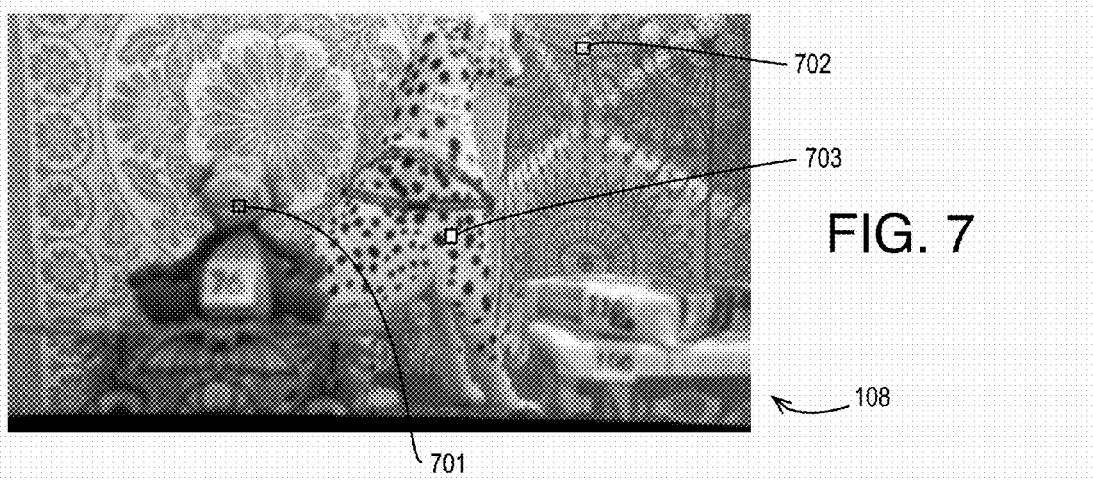
FIG. 7 illustrates an example final refocused image.

FIG. 7 illustrates example final refocused image 108, arranged in accordance with at least some implementations of the present disclosure. As shown in FIG. 7, final refocused image 108 includes a location 701 where a blur effect is desirable and a location 702 where no blur effect is desirable and remained focus is instead desirable, as discussed above. As shown, location 701 (and other areas of blur in final refocused image 108) has an aesthetically pleasing and substantially smooth blur. Furthermore, location 702 (and other areas in focus) are substantially sharp and remain in focus. Furthermore, a contrast may be made between location 701 and a location 703 such that location 701 has a greater blur effect as compared to location 703. Such an effect may also be aesthetically pleasing as it is expected that objects further from the point or object of interest as show with respect to location 702 have a greater blur (e.g., as at location 701) than those objects closer to the point or object of interest (e.g., as at location 703).

The techniques discussed herein associated with the Laplacian pyramid approximation may provide for quality aesthetically pleasing image results. Furthermore, the techniques may provide for substantially fast processing (e.g., real time processing). For example, for a 2×2 camera array providing 1280×960 (e.g., 1.3 megapixel) resolution images, the discussed refocusing pipeline (e.g., image rectification or scaling, displacement estimation for a location of interest, determination of the basic refocused image using an average and shift technique, and enhanced blurring using the described techniques) may be performed in 16 milliseconds or less using contemporary computing systems.

Figure 8:
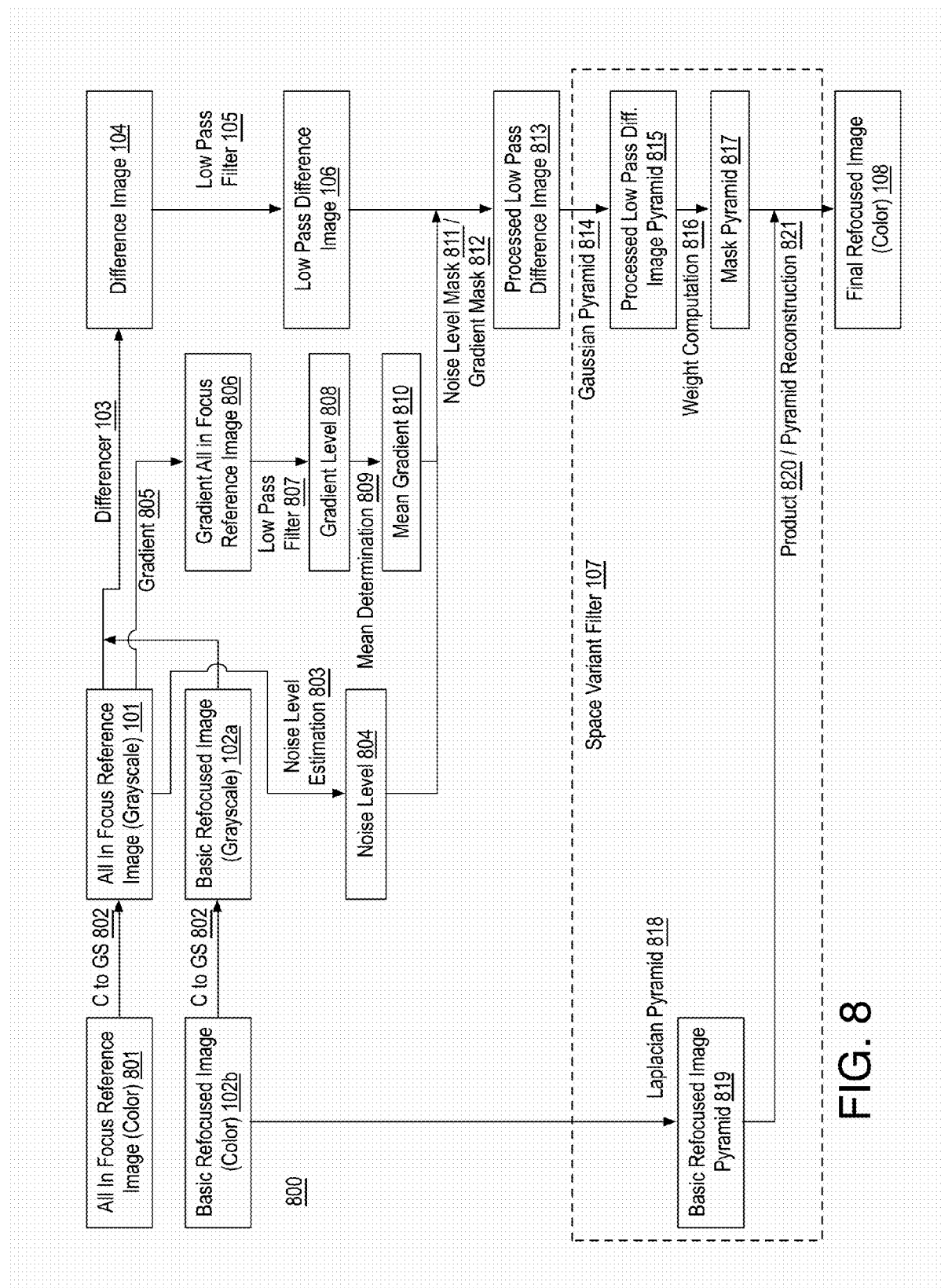
FIG. 8 is an illustrative diagram of an example system for providing image refocusing.

FIG. 8 is an illustrative diagram of an example system 800 for providing image refocusing, arranged in accordance with at least some implementations of the present disclosure. As shown in FIG. 8, system 800 may include differencer module 103, low pass filter module 105, and space variant filter module 107 as discussed above with respect to FIG. 1. System 800 may also include a color to grayscale module 802, a noise level estimation module 803, a gradient module 805, a low pass filter module 807, a mean determination module 809, a noise level mask module 811, and a gradient mask module 812. Furthermore, as shown, space variant filter module 107 may include a Gaussian pyramid module 814, a Laplacian pyramid module 818, a weight computation module 816, a product module 820, and a pyramid reconstruction module 821. In other embodiments, space variant filter module 107 may implement other modules to perform the operations discussed herein. In some examples, one or more of the discussed modules may be implemented via one or more central processing units such as those discussed herein.

As shown, color to grayscale module 802 may receive an all in focus reference image (color) 801 and basic refocused image (color) 102b. All in focus reference image (color) 801 may be user or system selected from multiple images attained via a camera array such as images 211-214 attained via camera array 200 as discussed herein. Furthermore, basic refocused image (color) 102b may be determined using any refocusing technique(s) such as a shift and average technique as discussed herein. Color to grayscale module 802 may convert all in focus reference image (color) 801 and basic refocused image (color) 102b to all in focus reference image (grayscale) 101 and basic refocused image (grayscale) 102a, respectively, using any suitable color to conversion technique(s) (e.g., a rgba2gray1f command). All in focus reference image (color) 801 and basic refocused image (color) 102b may be color images in the red green blue alpha (RGBA) color space, the red green blue (RGB) color space, or the like.

As shown, all in focus reference image (grayscale) 101 and basic refocused image (grayscale) 102a may be provided to differencer module 103, which may take a difference of the images to generate difference image 104 using any suitable technique(s) such as an absolute value difference (e.g., an absdiff command). Difference image 104 may be provided to low pass filter module 105, which may apply a low pass filter to difference image 104 to generate low pass difference image 106. In an embodiment, low pass filter module 105 may downsample difference image 104 any number of times (e.g., via a pyrDown command) and upsample via interpolation the same number of times (e.g., via a pyrUp command) to generate low pass difference image 106.

Also as shown, all in focus reference image (grayscale) 101 may be provided to noise level estimation module 803. For example, noise level estimation module 803 may estimate and/or map noise in all in focus reference image (grayscale) 101 to generate noise level 804. Noise level 804 may include one or more noise levels or a noise level mask. For example, noise level 804 may indicate those portions of basic refocused image (grayscale) 102a that may otherwise be subjected to undesirable blur by space variant filter module 107 (e.g., in the absence of noise level 804). By implementing noise level 804, native noise in all in focus reference image (grayscale) 101 may be used to properly avoid excessive blur in the in focus regions due to differences between the noise levels of the all in focus reference image (grayscale) 101 and the basic refocused image (grayscale) 102a as explained before.

Furthermore, all in focus reference image (grayscale) 101 may be provided to gradient module 805. For example, gradient module 805 may estimate or evaluate gradients in all in focus reference image (grayscale) 101 to generate gradient all in focus reference image 806. Gradient all in focus reference image 806 may be provided to low pass filter module 807, which may apply a low pass filter to generate gradient level 808. In some examples, low pass filter module 807 and low pass filter module 105 may be the same module and, in other examples, they may be implemented separately. Gradient level 808 may be provided to mean determination module 809, which may generate a mean based on gradient level 808 to generate mean gradient 810. As with noise level 804, gradient level 808 may indicate those portions of basic refocused image (grayscale) 102a that may otherwise be subject to undesirable blur. By implementing gradient level 808 and/or mean gradient 810, edges or the like in all in focus reference image (grayscale) 101 may be used to avoid excessive blur in regions with strong edges for which small misalignments can generate undesired strong difference, as discussed herein.

Continuing with FIG. 8, low pass difference image 106 may be used, in part, to estimate a space variant filter. For example, low pass difference image 106 may be provided to noise level mask module 811 and gradient mask module 812, which may be implemented together or separately, and may generate processed low pass difference image 813 having reduced noise and gradient effects. For example, by reducing noise and gradient effects, the effects of noise and intensity discontinuities in the all in focus reference image will not generate unwanted additional blur in final refocused image (color) 108. Noise level mask module 811 may also receive noise level 804 and may apply noise level 804 to low pass difference image 106. For example, applying noise level 804 may include subtracting noise level 804 from low pass difference image 106 and thresholding any resulting negative values to zero. For example, resulting negative values may be set to zero while positive values may be retained. Furthermore, gradient mask module 812 may also receive gradient level 808 and/or mean gradient 810 and may apply mean gradient 810 to low pass difference image 106 (or the resulting image from applying noise level 804). For example, applying mean gradient 810 may include multiplying low pass difference image 106 by mean gradient 810 and dividing by mean gradient 810 plus gradient level 808 (e.g., ×meang/(meang+g)) and applying a subsequent scaling, if needed. This normalization by the gradient will reduce the difference image whenever the gradient is large helping to avoid excusive blur in those regions.

Processed low pass difference image 813 may be provided to Gaussian pyramid module 814, which may generate processed low pass difference image pyramid 815. Processed low pass difference image pyramid 815 may include values equal to or proportional to the blur width, σ, to be applied via space variant filter module 107 based on the discussed Laplacian pyramid approximation technique and masked by noise level 804 and/or gradient level and mean gradient 810 as discussed. For example, space variant filter module 107 may refine basic refocused image (color) 102b by applying more blur to out of focus regions while preserving in focus regions based on difference image 104, low pass difference image 106, and/or processed low pass difference image 813 such that smaller differences in the difference image correspond to smaller applied blur and larger differences in the difference image correspond to larger applied blur. Using the discussed techniques, final refocused image (color) 108 may have less, fewer, or no artifacts in comparison to basic refocused image (color) 102b.

Figure 9:
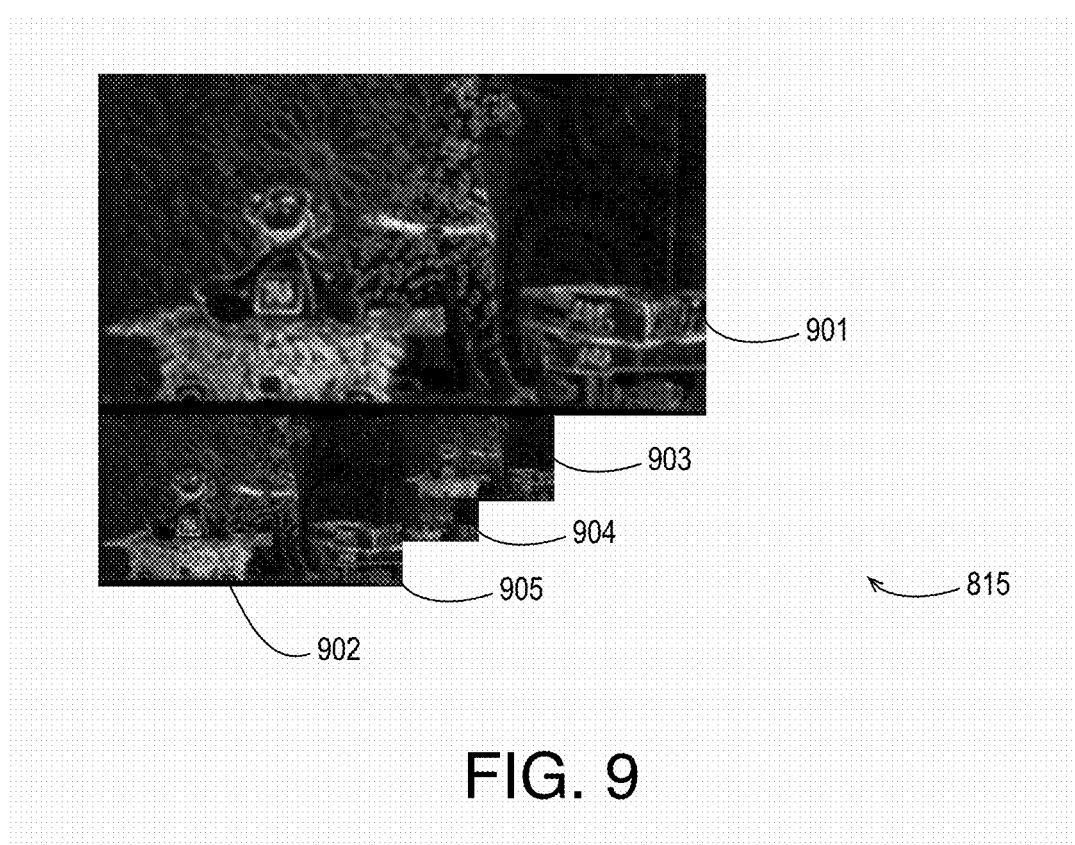
FIG. 9 illustrates an example processed low pass differential image pyramid.

FIG. 9 illustrates example processed low pass difference image pyramid 815, arranged in accordance with at least some implementations of the present disclosure. As shown in FIG. 9, processed low pass difference image pyramid 815 may include an approximation of processed low pass difference image 813 based on pyramid images 901-905, which are of decreasing resolution. For example, each of pyramid images 901-905 may be half of the resolution of the preceding image such that pyramid image 902 is half the resolution of pyramid image 901, pyramid image 903 is half the resolution of pyramid image 902, and so on. Other pyramids as discussed herein, like Laplacian pyramid 818, may also include such a decreasing resolution structure.

Returning to FIG. 8, Laplacian pyramid module 818 may receive basic refocused image (color) 102b and may generate basic refocused image pyramid 819. Furthermore, weight computation module 816 may receive processed low pass differential image pyramid 815 and may generate mask pyramid 817. Product module 820 may determine a product of basic refocused image pyramid 819 and mask pyramid 817 and pyramid reconstruction module 821 may reconstruct the product to generate final refocused image (color) 108.

Figure 10:
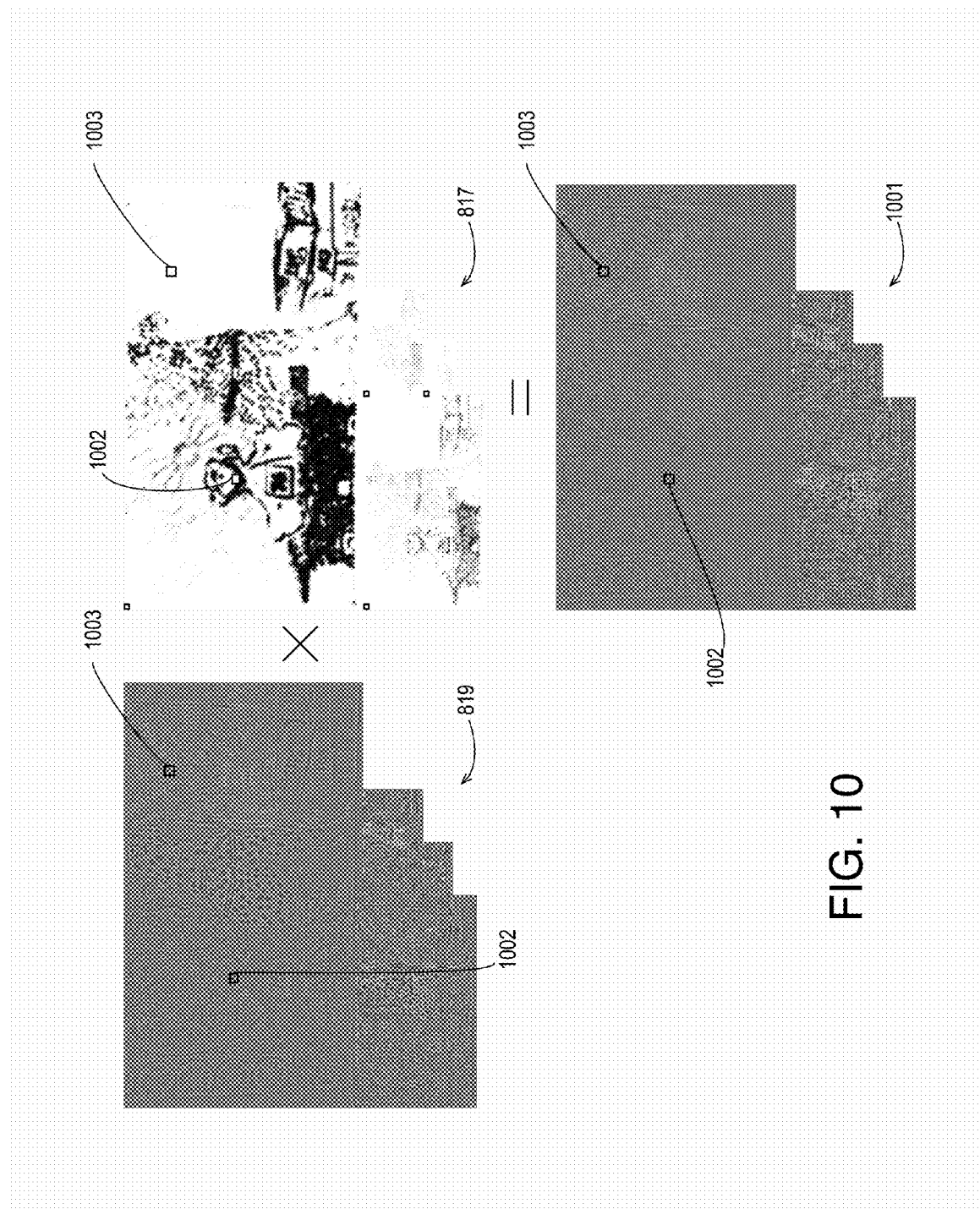
FIG. 10 illustrates an example product of a basic refocused image pyramid and a mask pyramid.

FIG. 10 illustrates an example product 1001 of basic refocused image pyramid 819 and mask pyramid 817, arranged in accordance with at least some implementations of the present disclosure. As shown in FIG. 10, product 1001 may be determined based on basic refocused image pyramid 819 and mask pyramid 817. As discussed, mask pyramid 817 may be generated based on processed low pass difference image pyramid 815. In an embodiment, mask pyramid 817 is the inverse of processed low pass difference image pyramid 815. FIG. 10 illustrates locations 1002, 1003 in basic refocused image pyramid 819, mask pyramid 817, and product 1001. As discussed above, location 1002 is associated with a region where more blur is desirable and location 1003 is associated with a region where no blur is desirable (e.g., where focus is to be maintained). As shown with respect to location 1003 of mask pyramid 817, locations of mask pyramid 817 that are white may be associated with locations where no blur is to be provided to basic refocused image pyramid 819. Furthermore, location 1002 of mask pyramid 917 indicates that locations of mask pyramid 817 that are black may be associated with locations where no blur is to be provided to basic refocused image pyramid 819.

In some examples, implementing a Laplacian pyramid approximation may replace explicit pixel averaging when generating or implementing a blur width. The implementation of a Laplacian pyramid approximation of a space variant filter may provide for a computationally efficient technique with a good quality approximation. For example, the Laplacian pyramid may approximate or provide for a local Fourier transform such that, in the transformed domain, the illustrated multiplication achieves a filtering that allows for different weights or blur widths in different spatial locations of the images. Such techniques provide for use of a relatively computationally simple multiplication to implement an approximation of a space variant filter.

For example, the coefficients of mask pyramid 817, which may also be termed weights as discussed herein, are provided according to the desired blur width and the pyramid level of mask pyramid 817. For example, a weighting Gaussian pyramid may be generated by applying a kernel with a circularly symmetric frequency response. In an embodiment, a cylinder blur kernel may be used. For example, to generate the results illustrated in FIG. 10, a cylinder blur kernel (e.g., a circular blur window) may be applied to generate mask pyramid 817. In an embodiment, the cylinder blur kernel in the spatial domain corresponds to $J_1(f)/f$, where $J_1$ is a Bessel function of the first kind of order 1, frequency response. In other examples, other kernels may be used to determine the frequency response such as, for example, a Gaussian kernel or an exponential kernel, or the like.

Furthermore, the pyramid structure of basic refocused image pyramid 819, mask pyramid 817, and product 1001 may provide for a larger effect or effective blur for those weights applied at lower resolutions of the pyramid (e.g., the smaller images in the illustrated example) and a smaller effect or effective blur for those weights applied at higher resolutions of the pyramid (e.g., the larger images in the illustrated example). Such a pyramid structure may thereby offer efficient implementation of a space variant filter.

With reference to FIG. 8, as discussed, pyramid reconstruction module 821 may reconstruct product 1001 to generate final refocused image (color) 108. In some examples, space variant filter module 107 may be applied independently to color channels of basic refocused image (color) 102b via basic refocused image pyramid 819. For example, mask pyramid 817 may be generated using grayscale images (e.g., all in focus reference image (grayscale) 101 and basic refocused image (grayscale) 102a) and may be applied to each color channel (e.g., RGB color channels) of basic refocused image pyramid 819 by product module 820 with the resulting product pyramid(s) being reconstructed via pyramid reconstruction module 821 to generate final refocused image (color) 108.

As discussed, in some examples, one or more of the modules of system 800 (e.g., color to grayscale module 802, differencer module 103, 805, low pass filter module 105, noise level estimation module 803, mean determination module 809, noise level mask module 811, gradient mask module 812, and space variant filter module 107 including Gaussian pyramid module 814, Laplacian pyramid module 818, weight computation module 816, product module 820, and pyramid reconstruction module 821) may be implemented via one or more central processing units. In other examples, the discussed modules may be implemented via a graphics processing unit(s)/central processing unit(s) (GPU/CPU) hybrid implementation.

Figure 11:
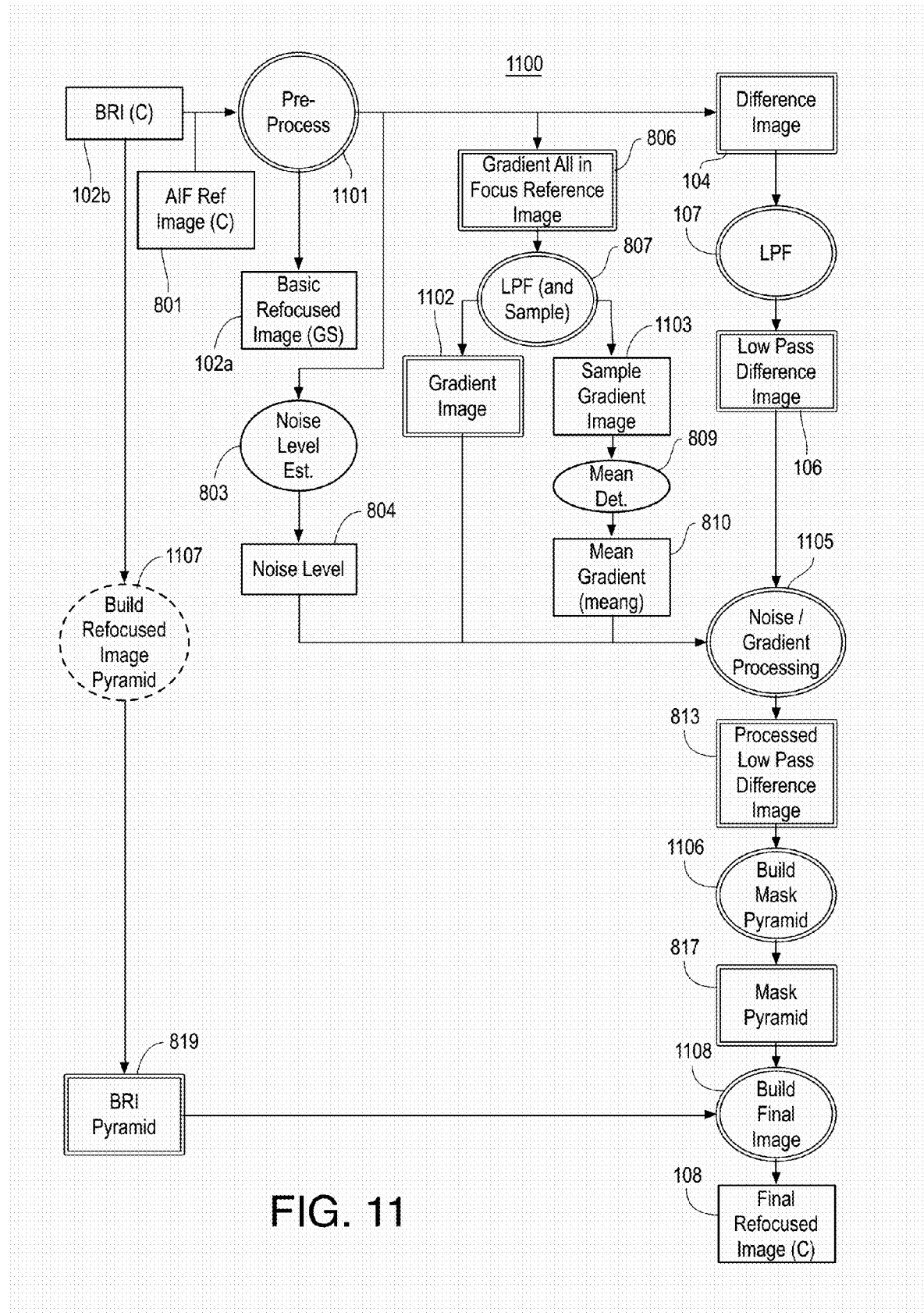
FIG. 11 is an illustrative diagram of an example system for providing image refocusing.

FIG. 11 is an illustrative diagram of an example system 1100 for providing image refocusing, arranged in accordance with at least some implementations of the present disclosure. In FIG. 11, circles or ovals with a single line represent modules implemented via a CPU, circles or ovals with double lines represent modules implemented via a GPU, squares or rectangles with a single line represent areas of memory buffers in system memory, squares or rectangles with double lines represent areas of memory buffers in video memory, and the circle with the dashed lines represents a module implemented via both the CPU and the GPU (such that the associated operations may be performed via the GPU when it is free and, when the GPU is not free, the associated operations may be performed via the CPU).

For example, system 1100 may include noise level estimation module 803 and mean determination module 809 implemented via a CPU and a build refocused image pyramid module 1107 implemented via both the CPU and the GPU (such that the associated operations may be performed via the GPU when it is free and, when the GPU is not free, the associated operations may be performed via the CPU). Furthermore, system 1100 may include a pre-process module 1101, low pass filter module 107, low pass filter (and sample) module 807, a noise/gradient processing module 1105, a build mask pyramid module 1106, and a build final image module 1108.

Also as shown, system 1100 may include basic refocused image (color) 102b, all in focus reference image (color) 801, basic refocused image (grayscale) 102a, noise level 804, a sample gradient image 1103, and mean gradient (meang) 810 stored in areas of memory buffers in system memory. Furthermore, system 1100 may include gradient all in focus reference image 806, difference image 104, a gradient image 1102, low pass difference image 106, processed low pass difference image 813, mask pyramid 817, and basic refocused image pyramid 819 stored in areas of memory buffers in video memory.

As shown in FIG. 11, pre-process module 1101 may receive basic refocused image (color) 102b and all in focus reference image (color) 801, and pre-process module 1101 may generate basic refocused image (grayscale) 102a, gradient all in focus reference image 806, and difference image 104, as discussed herein. In an embodiment, pre-process module 1101 may include and/or implement color to grayscale module 802, gradient module 805, and/or differencer module 103 as discussed herein.

Noise level estimation module 803 may receive all in focus reference image (grayscale) 101 and may generate noise level 804 as discussed herein. For example, noise level estimation module 803 may receive all in focus reference image (grayscale) 101 from and may store noise level 804 to system memory. Low pass filer (and sample) module 807 may receive gradient all in focus reference image 806 may generate gradient image 1102 and sample gradient image 1103. For example, gradient image 1102 may be stored in video memory and sample gradient image 1103 may be stored in system memory. As shown, mean determination module 809 may receive sample gradient image 1103 and may generate mean gradient (meang) 810 as discussed herein.

As shown, noise level 804, gradient image 1102, and mean gradient (meang) 810 may be provided to noise/gradient processing module 1105. In an embodiment, noise/gradient processing module 1105 may include or implement noise level mask module 811 and/or gradient mask module 812 as discussed herein. As shown, noise/gradient processing module 1105 may generate processed low pass difference image 813, which may be stored to video memory.

Processed low pass difference image 813 may be provided to build mask pyramid module 1106, which may implement or include a blur module such as weight computation module 816. Furthermore, basic refocused image (color) 102b may be provided to build refocused image pyramid module 1107, which may implement or include Laplacian pyramid module 818. For example, build refocused image pyramid module 1107 may generate basic refocused image pyramid 819 using a Laplacian build operation and/or any techniques as discussed herein. In an embodiment, build refocused image pyramid module 1107 may generate basic refocused image pyramid 819 independently for each color channel of basic refocused image (color) 102b.

Build final image module 1108 may receive basic refocused image (color) 102b and mask pyramid 817 and may generate final refocused image (color) 108. For example, build final image module 1108 may determine a product of basic refocused image (color) 102b and mask pyramid 817 and may reconstruct the resulting pyramid to generate final refocused image (color) 108. For example, the discussed product and reconstruction operations may be performed independently for each color channel of final refocused image (color) 108. In an embodiment, build final image module 1108 may include or implement product module 820 and/or pyramid reconstruction module 821.

The operations discussed with respect to system 1100 may be performed any number of times in parallel and/or in series to generate any number of final refocused images. As discussed, the generated final refocused images such as final refocused image (color) 108 (please refer to FIG. 7) may include a region of increased blur with respect to the all in focus reference image. The final refocused images may be efficiently and quickly generated (e.g., in real-time) and the region of increased blur may be smooth and substantially pleasing aesthetically.

Figure 12:
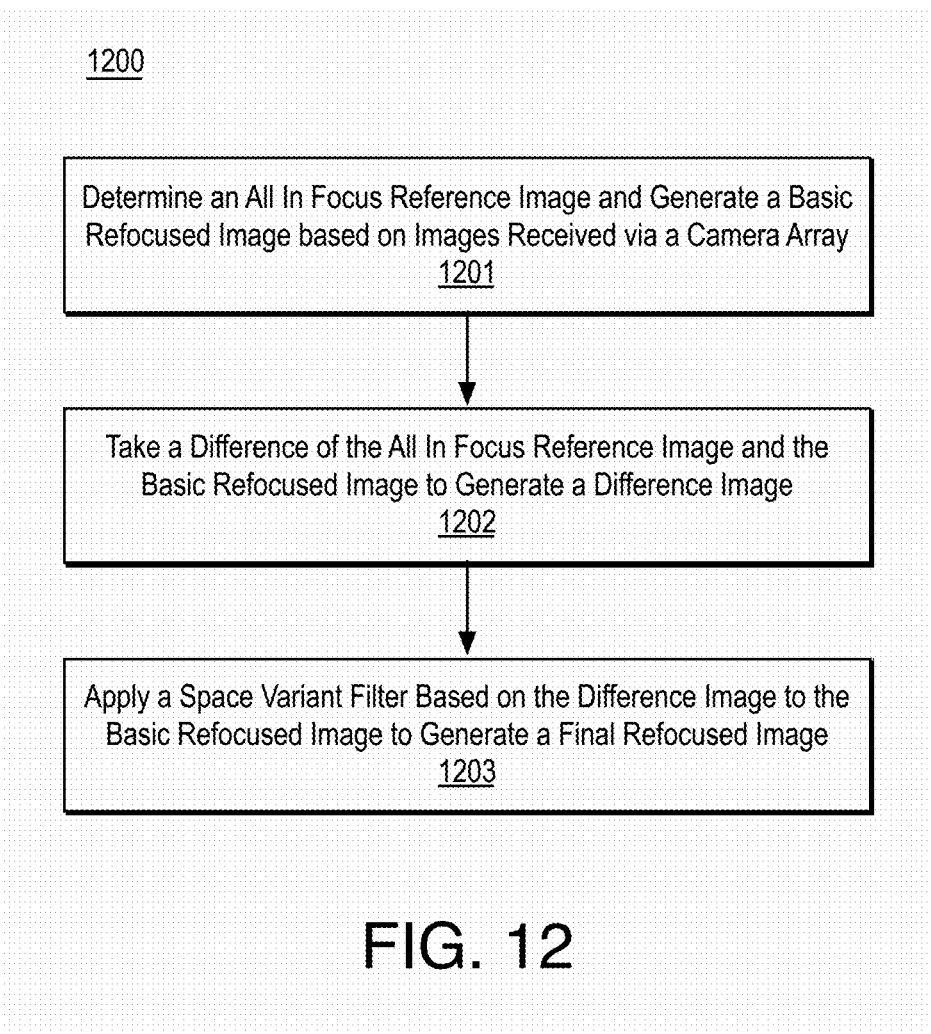
FIG. 12 is a flow diagram illustrating an example process for providing image refocusing.

FIG. 12 is a flow diagram illustrating an example process 1200 for providing image refocusing, arranged in accordance with at least some implementations of the present disclosure. Process 1200 may include one or more operations 1201-1203 as illustrated in FIG. 12. Process 1200 may form at least part of a refocusing process. By way of non-limiting example, process 1200 may form at least part of a refocusing process for one or more images attained via a camera array as undertaken by systems 100, 800, or 1100 as discussed herein. Further, process 1200 will be described herein in reference to system 1300 of FIG. 13.

Figure 13:
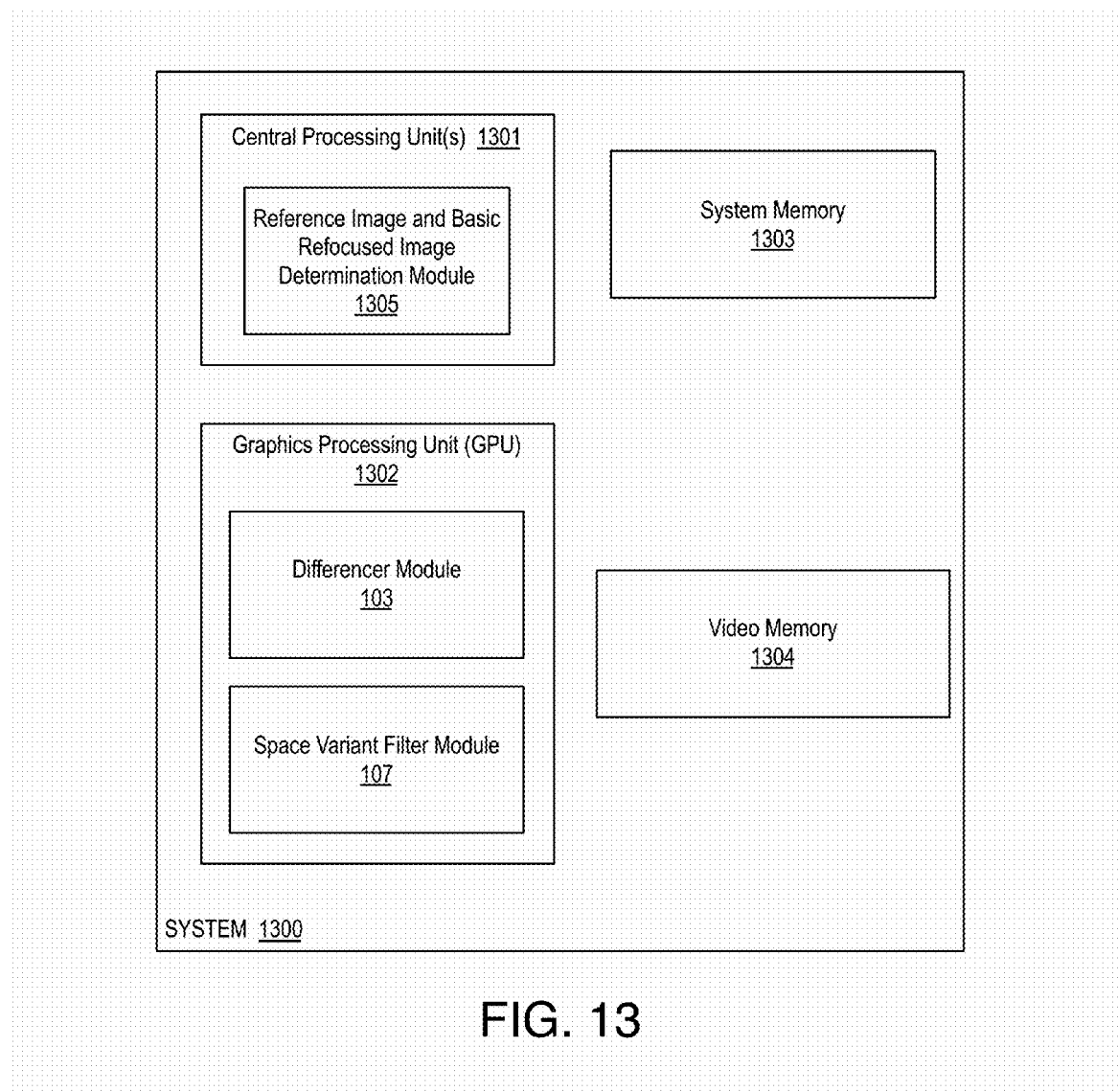
FIG. 13 is an illustrative diagram of an example system.

FIG. 13 is an illustrative diagram of an example system 1300, arranged in accordance with at least some implementations of the present disclosure. As shown in FIG. 13, system 1300 may include a graphics processing unit (GPU) 1302, one or more central processing units (CPU) 1301, system memory 1303, and video memory 1304. Also as shown, CPU 1301 may include reference image and basic refocused image determination module 1305 and GPU 1302 may include differencer module 103 and space variant filter module 107. In the example of system 1300, system memory 1303 and/or video memory 1304 may store image content such as input images, final resultant images, and/or any other image data as discussed herein.

Graphics processing unit 1302 may include any number and type of graphics processing units that may provide the operations as discussed herein. Such operations may be implemented via software or hardware or a combination thereof. For example, graphics processing unit 1302 may include circuitry dedicated to manipulate images obtained from system memory 1303 and/or video memory 1304. Central processing units 1301 may include any number and type of processing units or modules that may provide control and other high level functions for system 1300. System memory 1303 and video memory 1304 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, system memory 1303 and/or video memory 1304 may be implemented by cache memory. In an embodiment, differencer module 103 and/or space variant filter module 107 may be implemented via an execution unit (EU) of graphics processing unit 1302. The EU may include, for example, programmable logic or circuitry such as a logic core or cores that may provide a wide array of programmable logic functions. In an embodiment, differencer module 103 and/or space variant filter module 107 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 12, process 1200 may begin at operation 1201, "Determine an All In Focus Reference Image and Generate a Basic Refocused Image based on Images Received via a Camera Array", where an all in focus reference image and a basic refocused image may be determined based on a plurality of images received via a camera array. For example, all in focus reference image (color) 801, basic refocused image (color) 102b, all in focus reference image (grayscale) 101, and/or basic refocused image (grayscale) 102a may be determined via reference image and basic refocused image determination module 1305 as implemented via CPU 1301. In some examples, reference image and basic refocused image determination module 1305 may include color to grayscale module 802 and in other examples, color to grayscale module 802 may be implemented separately.

Processing may continue at operation 1202, "Take a Difference of the All In Focus Reference Image and the Basic Refocused Image to Generate a Difference Image", where the all in focus reference image and the basic refocused image may be differenced to generate a difference image. For example, differencer module 103 as implemented via GPU 1302 may difference all in focus reference image (grayscale) 101 and basic refocused image (grayscale) 102a to generate difference image 104.

Processing may continue at operation 1203, "Apply a Space Variant Filter Based on the Difference Image to the Basic Refocused Image to Generate a Final Refocused Image", where a space variant filter based at least in part on the difference image may be applied to the basic refocused image to generate a final refocused image having a region of increased blur with respect to the all in focus reference image. For example, space variant filter module 107 as implemented via GPU 1302 may implement a space variant filter to basic refocused image (color) 102b to generate final refocused image (color) 108 having a region or location 701 of increased blur with respect to all in focus reference image (color) 801 (please refer to FIG. 7).

Process 1200 may be repeated any number of times either in series or in parallel for any number of images received via a camera array.

Various components of the systems described herein may be implemented in software, firmware, and/or hardware and/or any combination thereof. For example, various components of systems 100, 800, 1100, or 1300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100, 800, 1100, or 1300, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
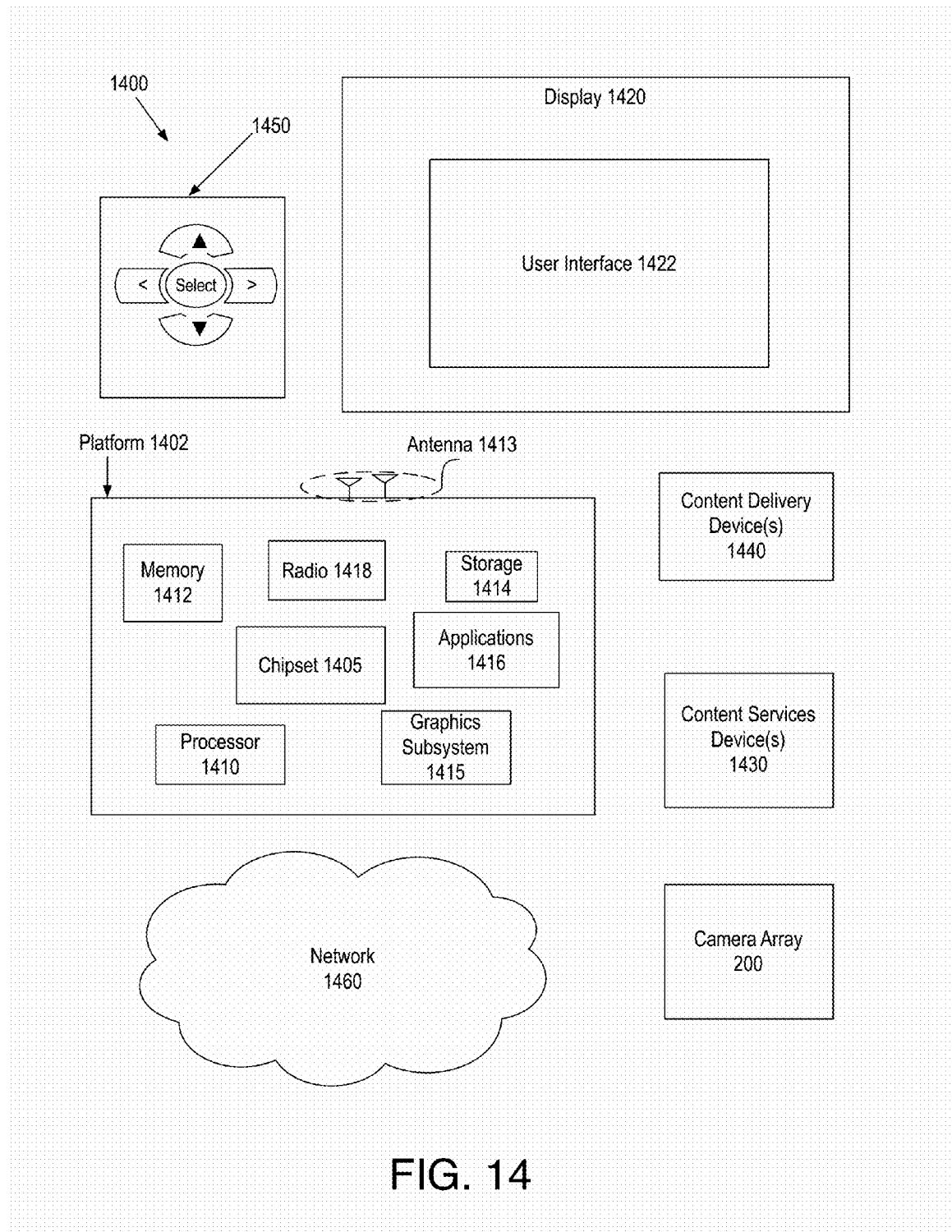
FIG. 14 is an illustrative diagram of an example system.

FIG. 14 is an illustrative diagram of an example system 1400, arranged in accordance with at least some implementations of the present disclosure. In various implementations, system 1400 may be a media system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1400 includes a platform 1402 coupled to a display 1420. Platform 1402 may receive content from a content device such as content services device(s) 1430 or content delivery device(s) 1440 or other similar content sources. As shown, in some examples, system 1400 may include camera array 200 and platform 1402 may receive images such as images 211-214 from camera array 200 as discussed herein. A navigation controller 1450 including one or more navigation features may be used to interact with, for example, platform 1402 and/or display 1420. Each of these components is described in greater detail below.

In various implementations, system 1400 may display real time (e.g., in display 1420) final refocused image (color) 108 obtained using the proposed method to one region of interest selected by the user, allowing for the application of the effect real time due to the speed of the approximate implementation of the method, while viewfinding or previewing the input video stream. For example, such real time presentation may be provide interactive viewfinding or previewing for a user.

In various implementations, platform 1402 may include any combination of a chipset 1405, processor 1410, memory 1412, antenna 1413, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In various embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In various embodiments, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
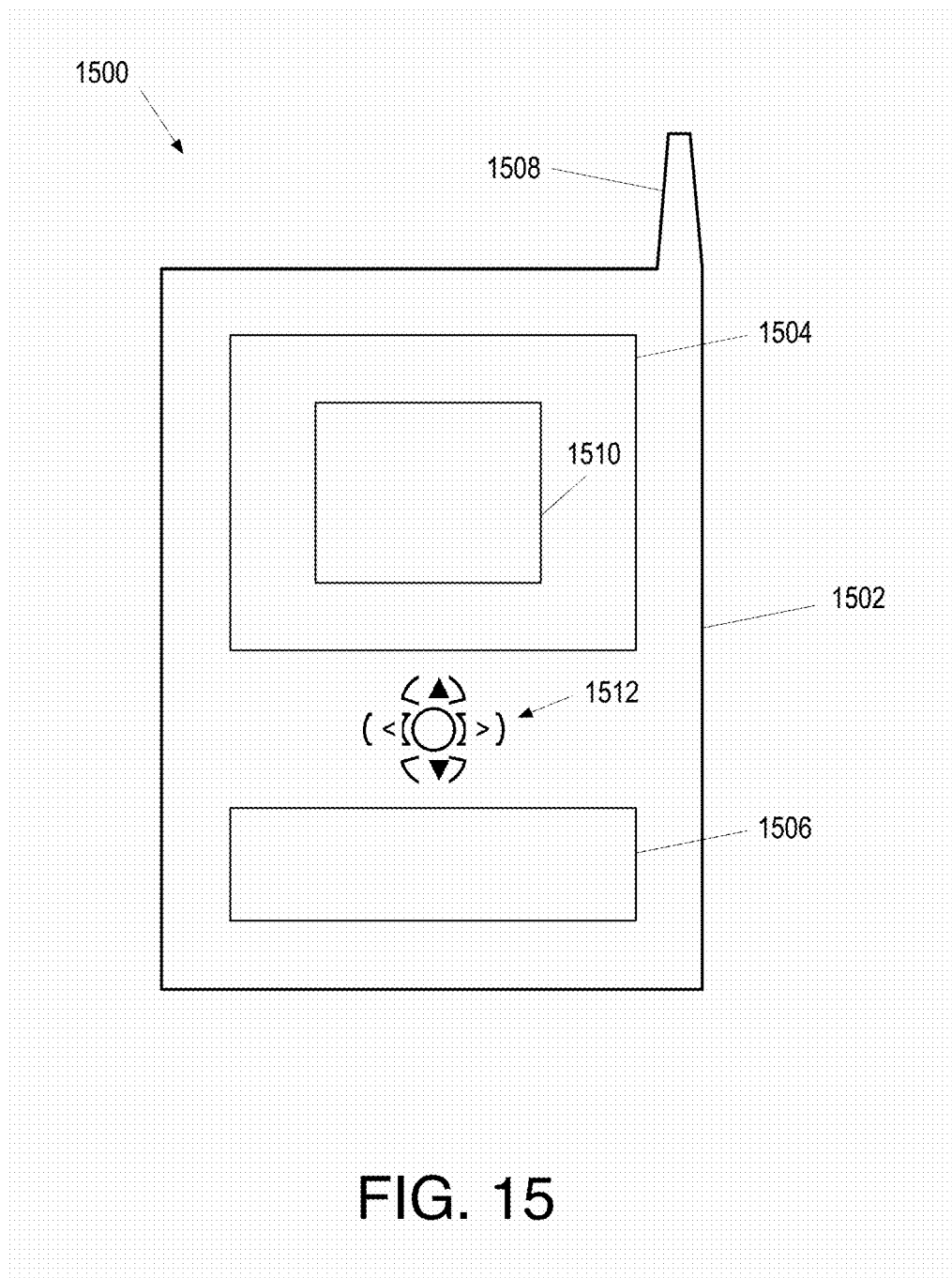
FIG. 15 illustrates an example device, all arranged in accordance with at least some implementations of the present disclosure.

As described above, system 1400 may be embodied in varying physical styles or form factors. FIG. 15 illustrates implementations of a small form factor device 1500 in which system 1500 may be embodied. In various embodiments, for example, device 1500 may be implemented as a mobile computing device a having wireless capabilities. A mobile computing device may refer to any device having a processing system and a mobile power source or supply, such as one or more batteries, for example. In some examples, device 1500 may include a camera array (e.g., camera array 200) and/or receive images (e.g., images 211-214) via a camera array (e.g., camera array 200) as discussed herein.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing 1502, a display 1504, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for providing image refocusing comprises determining an all in focus reference image and generating a basic refocused image based on a plurality of images received via a camera array, taking a difference of the all in focus reference image and the basic refocused image to generate a difference image, and applying a space variant filter based at least in part on the difference image to the basic refocused image to generate a final refocused image having a region of increased blur with respect to the all in focus reference image.

Further to the first embodiments, applying the space variant filter based on the difference image comprises increasing blur by a greater amount in a first region than in a second region of the basic refocused image, wherein the first region is associated with a first difference in the difference image and the second region is associated with a second difference in the difference image, and wherein the first difference is greater than the second difference.

Further to the first embodiments, the method further comprises applying a low pass filter to the difference image to generate a low pass difference image, wherein applying the space variant filter based at least in part on the difference image comprises applying the space variant filter based on the low pass difference image.

Further to the first embodiments, applying the space variant filter comprises applying the space variant filter based on a Laplacian pyramid approximation.

Further to the first embodiments, applying the space variant filter comprises applying the space variant filter based on a Laplacian pyramid approximation, wherein applying the space variant filter based on the Laplacian pyramid approximation comprises generating a basic refocused image Laplacian pyramid based on the basic refocused image, generating a mask pyramid based on the difference image, determining a product of the mask pyramid and the basic refocused image Laplacian pyramid, and reconstructing the product to generate the final refocused image.

Further to the first embodiments, applying the space variant filter comprises applying the space variant filter based on a Laplacian pyramid approximation, wherein applying the space variant filter based on the Laplacian pyramid approximation comprises generating a basic refocused image Laplacian pyramid based on the basic refocused image, generating a mask pyramid based on the difference image, determining a product of the mask pyramid and the basic refocused image Laplacian pyramid, and reconstructing the product to generate the final refocused image, and the method further comprises applying a low pass filter to the difference image to generate a low pass difference image, generating a noise level mask and a gradient mask based on the all in focus reference image, and applying the noise level mask and the gradient mask to the low pass difference image to generate a processed low pass difference image having reduced noise and gradient effects, wherein the mask pyramid is generated based on the processed low pass difference image.

Further to the first embodiments, applying the space variant filter comprises applying the space variant filter based on a Laplacian pyramid approximation, wherein applying the space variant filter based on the Laplacian pyramid approximation comprises generating a basic refocused image Laplacian pyramid based on the basic refocused image, generating a mask pyramid based on the difference image, determining a product of the mask pyramid and the basic refocused image Laplacian pyramid, and reconstructing the product to generate the final refocused image, wherein generating the mask pyramid comprises applying a kernel with a circularly symmetric frequency response.

Further to the first embodiments, the space variant filter comprises at least one of a noise level mask or a gradient mask.

Further to the first embodiments, taking the difference of the all in focus reference image and the basic refocused image comprises taking the difference of grayscale versions of the all in focus reference image and the basic refocused image.

Further to the first embodiments, applying the space variant filter to the basic refocused image comprises applying the space variant filter to each color channel of the basic refocused image independently.

Further to the first embodiments, taking the difference of the all in focus reference image and the basic refocused image comprises taking the difference of grayscale versions of the all in focus reference image and the basic refocused image and/or wherein applying the space variant filter to the basic refocused image comprises applying the space variant filter to each color channel of the basic refocused image independently.

Further to the first embodiments, the all in focus reference image comprises one of the plurality of images, and wherein determining the basic refocused image comprises shifting the remaining plurality of images based on a displacement associated with a desired depth and averaging the all in focus reference image and the shifted images to generate the basic refocused image.

In one or more second embodiments, a system for providing image refocusing on a computing device comprises a central processing unit coupled to the memory, wherein the central processing unit comprises reference image and basic refocused image determination circuitry configured to determine an all in focus reference image and generate a basic refocused image based on a plurality of images received via a camera array and a graphics processing unit coupled to the memory, wherein the graphics processing unit comprises differencer circuitry configured to take a difference of the all in focus reference image and the basic refocused image to generate a difference image and space variant filter circuitry configured to apply a space variant filter based at least in part on the difference image to the basic refocused image to generate a final refocused image having a region of increased blur with respect to the all in focus reference image.

Further to the second embodiments, the graphics processing unit further comprises low pass filter circuitry configured to apply a low pass filter to the difference image to generate a low pass difference image, wherein the space variant filter circuitry being configured to apply the space variant filter based at least in part on the difference image comprises the space variant filter circuitry configured to apply the space variant filter based on the low pass difference image.

Further to the second embodiments, the space variant filter circuitry is configured to apply the space variant filter based on a Laplacian pyramid approximation.

Further to the second embodiments, the space variant filter circuitry is configured to apply the space variant filter based on a Laplacian pyramid approximation and graphics processing unit further comprises pyramid circuitry configured to generate a basic refocused image Laplacian pyramid based on the basic refocused image and a weighting Gaussian pyramid based on the difference image, product circuitry configured to determine a product of the weighting Gaussian pyramid and the basic refocused image Laplacian pyramid, and pyramid reconstruction circuitry configured to reconstruct the product to generate the final refocused image.

Further to the second embodiments, the space variant filter circuitry is configured to apply the space variant filter based on a Laplacian pyramid approximation and graphics processing unit further comprises pyramid circuitry configured to generate a basic refocused image Laplacian pyramid based on the basic refocused image and a weighting Gaussian pyramid based on the difference image, product circuitry configured to determine a product of the weighting Gaussian pyramid and the basic refocused image Laplacian pyramid, and pyramid reconstruction circuitry configured to reconstruct the product to generate the final refocused image, wherein the pyramid circuitry is configured to generate the weighting Gaussian pyramid based on a kernel with a circularly symmetric frequency response.

Further to the second embodiments, the differencer circuitry is configured to take the difference of the all in focus reference image and the basic refocused image based on grayscale versions of the all in focus reference image and the basic refocused image, and wherein the space variant filter circuitry is configured to apply the space variant filter to each color channel of the basic refocused image independently.

Further to the second embodiments, the space variant filter comprises at least one of a noise level mask or a gradient mask.

Further to the second embodiments, the differencer circuitry is configured to take the difference of the all in focus reference image and the basic refocused image based on grayscale versions of the all in focus reference image and the basic refocused image.

Further to the second embodiments, the space variant filter circuitry is configured to apply the space variant filter to each color channel of the basic refocused image independently.

Further to the second embodiments, the all in focus reference image comprises one of the plurality of images, and wherein the reference image and basic refocused image determination circuitry is configured to determine the basic refocused image by the reference image and basic refocused image determination circuitry being configured to shift the remaining plurality of images based on a displacement associated with a desired depth and average the all in focus reference image and the shifted images to generate the basic refocused image.

Further to the second embodiments, the system further comprises a display configured to display the final refocused image in real time to a user.

In one or more third embodiments, a system for providing image refocusing on a computing device comprises means for determining an all in focus reference image and generating a basic refocused image based on a plurality of images received via a camera array, means for taking a difference of the all in focus reference image and the basic refocused image to generate a difference image, and means for applying a space variant filter based at least in part on the difference image to the basic refocused image to generate a final refocused image having a region of increased blur with respect to the all in focus reference image.

Further to the third embodiments, the means for applying the space variant filter comprise means for applying the space variant filter based on a Laplacian pyramid approximation.

Further to the third embodiments, the system further comprises means for generating a basic refocused image Laplacian pyramid based on the basic refocused image, means for generating a mask pyramid based on the difference image, means for determining a product of the mask pyramid and the basic refocused image Laplacian pyramid, and means for reconstructing the product to generate the final refocused image.

Further to the third embodiments, the system further comprises means for generating a basic refocused image Laplacian pyramid based on the basic refocused image, means for generating a mask pyramid based on the difference image, means for determining a product of the mask pyramid and the basic refocused image Laplacian pyramid, means for reconstructing the product to generate the final refocused image, means for applying a low pass filter to the difference image to generate a low pass difference image, means for generating a noise level mask and a gradient mask based on the all in focus reference image, and means for applying the noise level mask and the gradient mask to the low pass difference image to generate a processed low pass difference image having reduced noise and gradient effects, wherein the mask pyramid is generated based on the processed low pass difference image.

In one or more fourth embodiments, at least one machine readable medium comprises a plurality of instructions that in response to being executed on a computing device, cause the computing device to provide image refocusing by generating a basic refocused image Laplacian pyramid based on the basic refocused image, generating a mask pyramid based on the difference image, determining a product of the mask pyramid and the basic refocused image Laplacian pyramid, and reconstructing the product to generate the final refocused image.

Further to the fourth embodiments, applying the space variant filter comprises applying the space variant filter based on a Laplacian pyramid approximation.

Further to the fourth embodiments, the machine readable medium further comprises instructions that cause the computing device to provide image refocusing by generating a basic refocused image Laplacian pyramid based on the basic refocused image, generating a mask pyramid based on the difference image, determining a product of the mask pyramid and the basic refocused image Laplacian pyramid, and reconstructing the product to generate the final refocused image.

Further to the fourth embodiments, the machine readable medium further comprises instructions that cause the computing device to provide image refocusing by generating a basic refocused image Laplacian pyramid based on the basic refocused image, generating a mask pyramid based on the difference image, determining a product of the mask pyramid and the basic refocused image Laplacian pyramid, reconstructing the product to generate the final refocused image, applying a low pass filter to the difference image to generate a low pass difference image, generating a noise level mask and a gradient mask based on the all in focus reference image, and applying the noise level mask and the gradient mask to the low pass difference image to generate a processed low pass difference image having reduced noise and gradient effects, wherein the mask pyramid is generated based on the processed low pass difference image.

Further to the fourth embodiments, the machine readable medium further comprises instructions that cause the computing device to provide image refocusing by generating a basic refocused image Laplacian pyramid based on the basic refocused image, generating a mask pyramid based on the difference image, determining a product of the mask pyramid and the basic refocused image Laplacian pyramid, reconstructing the product to generate the final refocused image, applying a low pass filter to the difference image to generate a low pass difference image, generating a noise level mask and a gradient mask based on the all in focus reference image, and applying the noise level mask and the gradient mask to the low pass difference image to generate a processed low pass difference image having reduced noise and gradient effects, wherein the mask pyramid is generated based on the processed low pass difference image, wherein generating the mask pyramid comprises applying a kernel with a circularly symmetric frequency response.

Further to the fourth embodiments, the space variant filter comprises at least one of a noise level mask or a gradient mask.

Further to the fourth embodiments, taking the difference of the all in focus reference image and the basic refocused image comprises taking the difference of grayscale versions of the all in focus reference image and the basic refocused image, and wherein applying the space variant filter to the basic refocused image comprises applying the space variant filter to each color channel of the basic refocused image independently.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:
1. A computer-implemented method for providing image refocusing comprising:
  determining an all in focus reference image and generating a basic refocused image based on a plurality of images received via a camera array;
  taking a difference of the all in focus reference image and the basic refocused image to generate a difference image; and
  applying a space variant filter based at least in part on the difference image to the basic refocused image to generate a final refocused image having a region of increased blur with respect to the all in focus reference image, wherein applying the space variant filter based on the difference image comprises increasing blur by a greater amount in a first region than in a second region of the basic refocused image, wherein the first region is associated with a first difference in the difference image and the second region is associated with a second difference in the difference image, and wherein the first difference is greater than the second difference.
2. The method of claim 1, further comprising:
  applying a low pass filter to the difference image to generate a low pass difference image, wherein applying the space variant filter based at least in part on the difference image comprises applying the space variant filter based on the low pass difference image.

3. The method of claim 1, wherein applying the space variant filter comprises applying the space variant filter based on a Laplacian pyramid approximation.

4. The method of claim 3, wherein applying the space variant filter based on the Laplacian pyramid approximation comprises:
   generating a basic refocused image Laplacian pyramid based on the basic refocused image;
   generating a mask pyramid based on the difference image;
   determining a product of the mask pyramid and the basic refocused image Laplacian pyramid; and
   reconstructing the product to generate the final refocused image.

5. The method of claim 4, further comprising:
   applying a low pass filter to the difference image to generate a low pass difference image;
   generating a noise level mask and a gradient mask based on the all in focus reference image; and
   applying the noise level mask and the gradient mask to the low pass difference image to generate a processed low pass difference image having reduced noise and gradient effects, wherein the mask pyramid is generated based on the processed low pass difference image.

6. The method of claim 4, wherein generating the mask pyramid comprises applying a kernel with a circularly symmetric frequency response.

7. The method of claim 1, wherein the space variant filter comprises at least one of a noise level mask or a gradient mask.

8. The method of claim 1, wherein taking the difference of the all in focus reference image and the basic refocused image comprises taking the difference of grayscale versions of the all in focus reference image and the basic refocused image.

9. The method of claim 1, wherein applying the space variant filter to the basic refocused image comprises applying the space variant filter to each color channel of the basic refocused image independently.

10. The method of claim 1, wherein the all in focus reference image comprises one of the plurality of images, and wherein determining the basic refocused image comprises shifting the remaining plurality of images based on a displacement associated with a desired depth and averaging the all in focus reference image and the shifted images to generate the basic refocused image.

11. A system for providing image refocusing on a computing device, comprising:
   a memory configured to store image data;
   a central processing unit coupled to the memory, wherein the central processing unit comprises:
      reference image and basic refocused image determination circuitry configured to determine an all in focus reference image and generate a basic refocused image based on a plurality of images received via a camera array; and
   a graphics processing unit coupled to the memory, wherein the graphics processing unit comprises:
      differencer circuitry configured to take a difference of the all in focus reference image and the basic refocused image to generate a difference image; and
      space variant filter circuitry configured to apply a space variant filter based at least in part on the difference image to the basic refocused image to generate a final refocused image having a region of increased blur with respect to the all in focus reference image, wherein to apply the space variant filter based on the difference image comprises the space variant filter circuitry to increase blur by a greater amount in a first region than in a second region of the basic refocused image, wherein the first region is associated with a first difference in the difference image and the second region is associated with a second difference in the difference image, and wherein the first difference is greater than the second difference.

12. The system of claim 11, wherein the graphics processing unit further comprises:
   low pass filter circuitry configured to apply a low pass filter to the difference image to generate a low pass difference image, wherein the space variant filter circuitry being configured to apply the space variant filter based at least in part on the difference image comprises the space variant filter circuitry configured to apply the space variant filter based on the low pass difference image.

13. The system of claim 11, wherein the space variant filter circuitry is configured to apply the space variant filter based on a Laplacian pyramid approximation.

14. The system of claim 13, wherein the graphics processing unit further comprises:
   pyramid circuitry configured to generate a basic refocused image Laplacian pyramid based on the basic refocused image and a weighting Gaussian pyramid based on the difference image;
   product circuitry configured to determine a product of the weighting Gaussian pyramid and the basic refocused image Laplacian pyramid; and
   pyramid reconstruction circuitry configured to reconstruct the product to generate the final refocused image.

15. The system of claim 14, wherein the pyramid circuitry is configured to generate the weighting Gaussian pyramid based on a kernel with a circularly symmetric frequency response.

16. The system of claim 11, wherein the differencer circuitry is configured to take the difference of the all in focus reference image and the basic refocused image based on grayscale versions of the all in focus reference image and the basic refocused image, and wherein the space variant filter circuitry is configured to apply the space variant filter to each color channel of the basic refocused image independently.

17. The system of claim 11, further comprising:
   a display configured to display the final refocused image in real time to a user.

18. At least one non-transitory machine readable medium comprising a plurality of instructions that in response to being executed on a computing device, cause the computing device to provide image refocusing by:
   determining an all in focus reference image and generating a basic refocused image based on a plurality of images received via a camera array;
   taking a difference of the all in focus reference image and the basic refocused image to generate a difference image; and
   applying a space variant filter based at least in part on the difference image to the basic refocused image to generate a final refocused image having a region of increased blur with respect to the all in focus reference image, wherein applying the space variant filter based on the difference image comprises increasing blur by a greater amount in a first region than in a second region of the basic refocused image, wherein the first region is associated with a first difference in the difference image and the second region is associated with a second difference in the difference image, and wherein the first difference is greater than the second difference.

19. The machine readable medium of claim 18, wherein applying the space variant filter comprises applying the space variant filter based on a Laplacian pyramid approximation.

20. The machine readable medium of claim 18 further comprising instructions that cause the computing device to provide image refocusing by:
generating a basic refocused image Laplacian pyramid based on the basic refocused image;
generating a mask pyramid based on the difference image;
determining a product of the mask pyramid and the basic refocused image Laplacian pyramid; and
reconstructing the product to generate the final refocused image.

21. The machine readable medium of claim 20 further comprising instructions that cause the computing device to provide image refocusing by:
applying a low pass filter to the difference image to generate a low pass difference image;
generating a noise level mask and a gradient mask based on the all in focus reference image; and
applying the noise level mask and the gradient mask to the low pass difference image to generate a processed low pass difference image having reduced noise and gradient effects, wherein the mask pyramid is generated based on the processed low pass difference image.

22. The machine readable medium of claim 20, wherein generating the mask pyramid comprises applying a kernel with a circularly symmetric frequency response.

23. The machine readable medium of claim 18, wherein the space variant filter comprises at least one of a noise level mask or a gradient mask.

24. The machine readable medium of claim 18, wherein taking the difference of the all in focus reference image and the basic refocused image comprises taking the difference of grayscale versions of the all in focus reference image and the basic refocused image, and wherein applying the space variant filter to the basic refocused image comprises applying the space variant filter to each color channel of the basic refocused image independently.

* * * * *